(12) United States Patent
Yang

(10) Patent No.: US 9,906,715 B2
(45) Date of Patent: Feb. 27, 2018

(54) ELECTRONIC DEVICE AND METHOD FOR INCREASING A FRAME RATE OF A PLURALITY OF PICTURES PHOTOGRAPHED BY AN ELECTRONIC DEVICE

(71) Applicant: HTC Corporation, Taoyuan (TW)

(72) Inventor: Kai-Ming Yang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 33 days.

(21) Appl. No.: 14/952,545

(22) Filed: Nov. 25, 2015

(65) Prior Publication Data

US 2017/0013192 A1 Jan. 12, 2017

Related U.S. Application Data

(60) Provisional application No. 62/189,919, filed on Jul. 8, 2015.

(51) Int. Cl.
*H04N 5/232* (2006.01)
*H04N 5/247* (2006.01)
*H04N 5/225* (2006.01)
*H04N 5/14* (2006.01)

(52) U.S. Cl.
CPC ......... *H04N 5/23232* (2013.01); *H04N 5/145* (2013.01); *H04N 5/2258* (2013.01); *H04N 5/232* (2013.01); *H04N 5/247* (2013.01)

(58) Field of Classification Search
CPC ... H04N 5/23232; H04N 5/145; H04N 5/2258
See application file for complete search history.

(56) References Cited

U.S. PATENT DOCUMENTS

| | | | |
|---|---|---|---|
| 7,031,497 B2 | 4/2006 | Trajković | |
| 2007/0189386 A1* | 8/2007 | Imagawa | G06T 3/0087 375/240.12 |
| 2008/0211941 A1* | 9/2008 | Deever | H04N 5/2258 348/262 |
| 2010/0277619 A1* | 11/2010 | Scarff | H04N 5/2258 348/240.1 |
| 2011/0007135 A1 | 1/2011 | Okada et al. | |
| 2011/0012998 A1 | 1/2011 | Pan | |
| 2011/0249086 A1 | 10/2011 | Guo et al. | |
| 2012/0007952 A1 | 1/2012 | Otsuka | |
| 2012/0327195 A1 | 12/2012 | Cheng | |

(Continued)

FOREIGN PATENT DOCUMENTS

| | | |
|---|---|---|
| EP | 2733921 A1 | 5/2014 |
| TW | 201215139 A1 | 4/2012 |
| TW | 201230788 A1 | 7/2012 |

*Primary Examiner* — Christopher K Peterson
(74) *Attorney, Agent, or Firm* — Birch, Stewart, Kolasch & Birch, LLP

(57) ABSTRACT

An electronic device includes a first camera module photographing according to a first frame rate, a second camera module photographing according to a second frame rate and a multimedia processor coupled to the first camera module and the second camera module. The multimedia processor instructs the first camera module and the second camera module to alternately photograph to obtain a sequence of pictures recorded at a third frame rate. The third frame rate is higher than the first frame rate and the second frame rate.

18 Claims, 9 Drawing Sheets

(56) References Cited

U.S. PATENT DOCUMENTS

| | | |
|---|---|---|
| 2013/0106841 A1 | 5/2013 | Ko |
| 2013/0148950 A1 | 6/2013 | Chang |
| 2013/0301706 A1 | 11/2013 | Qiu et al. |
| 2014/0139639 A1 | 5/2014 | Wagner et al. |
| 2014/0192213 A1 | 7/2014 | Han et al. |
| 2014/0233860 A1 | 8/2014 | Kis et al. |
| 2014/0285635 A1 | 9/2014 | Ju et al. |
| 2014/0361905 A1 | 12/2014 | Sadasivam et al. |
| 2016/0007008 A1* | 1/2016 | Molgaard .......... H04N 5/23212 348/47 |
| 2016/0261807 A1* | 9/2016 | Seshadrinathan .... H04N 5/2258 |

\* cited by examiner

1

ELECTRONIC DEVICE AND METHOD FOR INCREASING A FRAME RATE OF A PLURALITY OF PICTURES PHOTOGRAPHED BY AN ELECTRONIC DEVICE

CROSS REFERENCE TO RELATED APPLICATIONS

This application claims the benefit of U.S. Provisional Application No. 62/189,919 filed 2015 Jul. 8 and entitled "Electronic device and method for increasing a frame rate of a plurality of pictures photographed by an electronic device", and the entire contents of which are hereby incorporated by reference.

BACKGROUND OF THE INVENTION

Field of the Invention

The invention relates to an electronic device, and more particularly to an electronic device method for increasing a frame rate of a plurality of pictures photographed by the electronic device.

Description of the Related Art

An increasing number of devices are being produced that are enabled to capture and display images. For example, electronic devices, such as cell phones, are increasingly being equipped with cameras to capture images, including still snapshots and motion video images. Images captured by such devices can frequently be viewed on displays of the devices, as well as being transferred from the devices for viewing elsewhere. To view the images on relatively small devices, the images typically must be viewed on small display screens that are not capable of viewing the full resolution of the captured images. Thus, such devices must include at least a limited image processing capability to down-size the images for viewing on the small display screens.

Many electronic devices have limited processing capability due to cost, power consumption, and size constraints. However, the processing of captured images, especially the processing of video, is very computationally intensive. For example, many electronic devices have cameras capable of capturing images of 2 MegaPixels (MPel) or more. Thus, a processor of such an electronic device must be capable of processing a large amount of data for each captured image.

In order to further enhance qualities of the image and video captured by an electronic device, methods for increasing a frame rate of a plurality of pictures photographed by the electronic device are proposed.

BRIEF SUMMARY OF THE INVENTION

An electronic device and methods for increasing a frame rate of a plurality of pictures photographed by an electronic device are provided. An exemplary embodiment of an electronic device comprises a first camera module photographing according to a first frame rate, a second camera module photographing according to a second frame rate and a multimedia processor coupled to the first camera module and the second camera module. The multimedia processor instructs the first camera module and the second camera module to alternately photograph to obtain a sequence of pictures recorded at a third frame rate. The third frame rate is higher than the first frame rate and the second frame rate.

An exemplary embodiment of a method for increasing a frame rate of a plurality of pictures photographed by an electronic device, which comprising at least a first camera module photographing according to a first frame rate and a second camera module photographing according to a second frame rate, comprising: measuring a first delay time for the first camera module to photograph and a second delay time for the second camera module to photograph; and instructing the first camera module and the second camera module to alternately photograph according to the first delay time and the second delay time to obtain a sequence of pictures recorded at a third frame rate. The third frame rate is higher than the first frame rate and the second frame rate A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
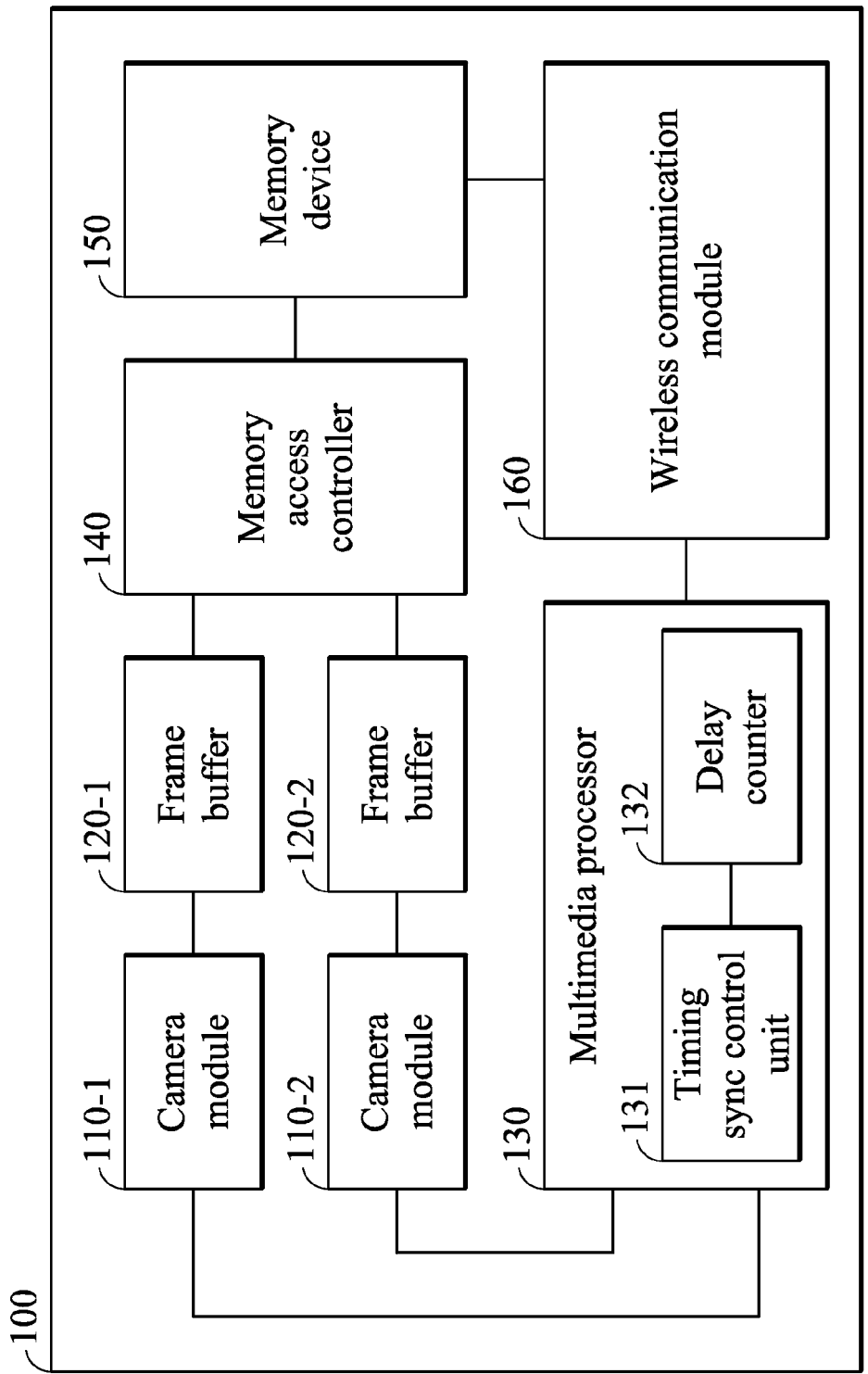
FIG. 1 shows a block diagram of an electronic device according to an embodiment of the invention.

FIG. 1 shows a block diagram of an electronic device according to an embodiment of the invention. The electronic device 100 may at least comprise more than one camera module, such as camera modules 110-1 and 110-2; more than one frame buffer, such as frame buffers 120-1 and 120-2; a multimedia processor 130; a memory access controller 140; and a memory device 150. Note that, in order to clarify the concept of the invention, FIG. 1 presents a simplified block diagram in which only the elements relevant to the invention are shown. However, the invention should not be limited what is shown in FIG. 1.

According to an embodiment of the invention, each camera module may at least comprise a lens, an image sensor, a shutter, and a camera controller (not shown) for controlling the operation of the camera module. The frame buffers 120-1 and 120-2 are coupled to the camera modules 110-1 and 110-2 for respectively buffering the image data captured by the corresponding camera module. The multimedia processor 130 is coupled to the camera modules 110-1 and 110-2 and issues commands via a corresponding interface, such as an I2C interface (not shown) coupled therebetween, to configure the corresponding camera module and instruct the corresponding camera module to photograph. The memory access controller 140 is coupled to the frame buffers 120-1 and 120-2 for obtaining the image data from the frame buffers 120-1 and 120-2 and further storing the image data to the memory device 150. According to an embodiment of the invention, the memory device 150 may be an internal memory or an external memory of the electronic device 100. For example, the memory device 150 may be an Embedded MultiMediaCard (eMMC). Note that, in some embodiments of the invention, the electronic device 100 may further comprise a wireless communication module 160 for providing wireless communications functionality.

Figure 2A:
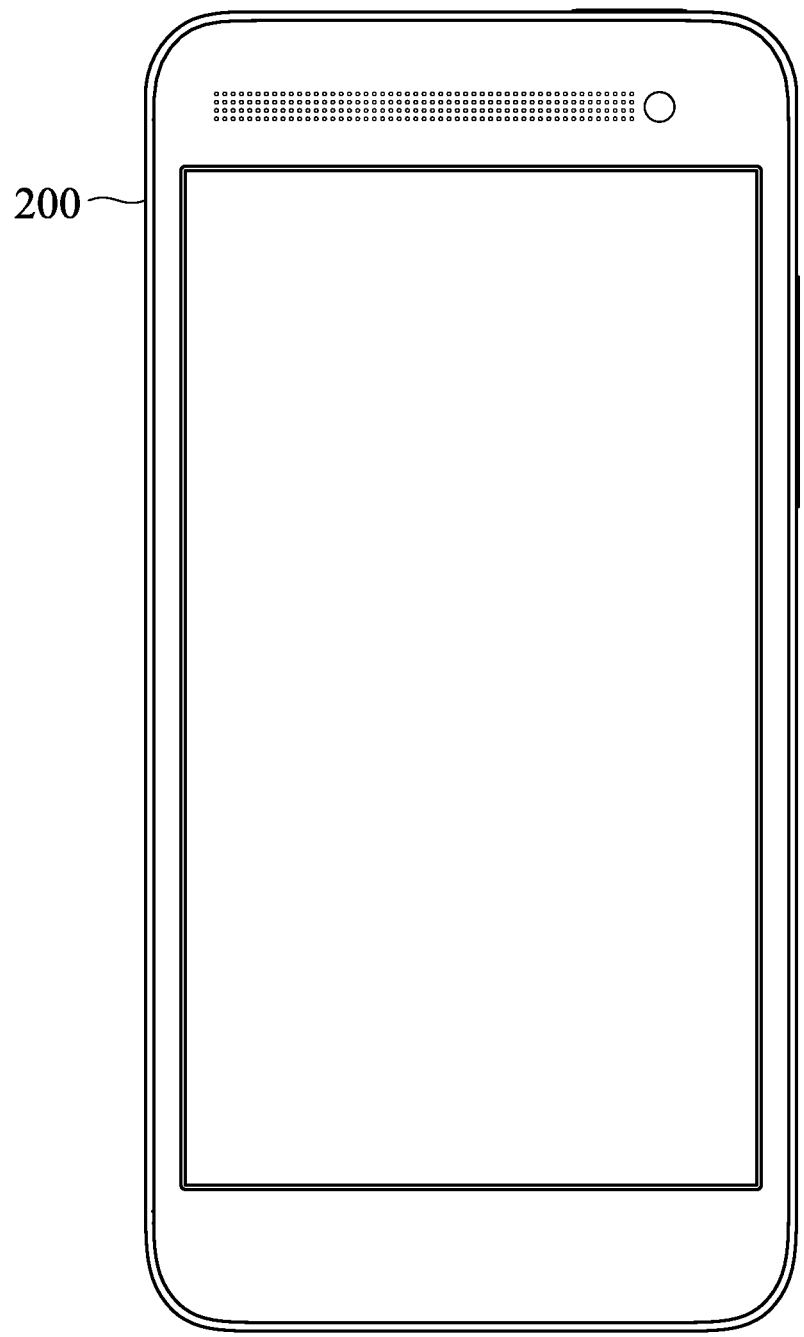
FIG. 2A shows a front view of the electronic device according to an embodiment of the invention.
Figure 2B:
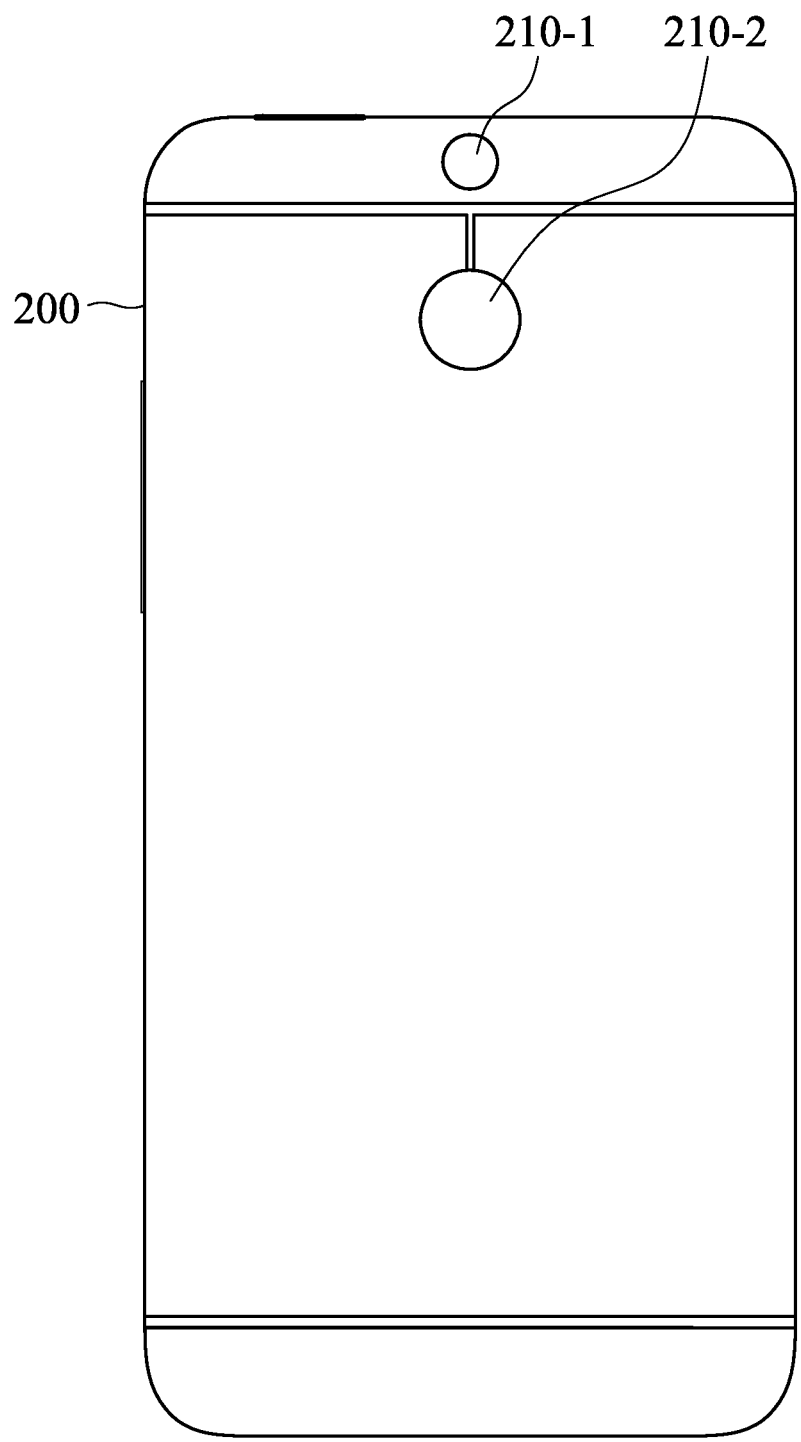
FIG. 2B shows a back view of the electronic device according to an embodiment of the invention.

FIG. 2A shows a front view of the electronic device according to an embodiment of the invention, and FIG. 2B shows a back view of the electronic device according to an embodiment of the invention. Note that the appearance of the electronic device 200 shown in FIG. 2A and FIG. 2B are only one of a variety of embodiments, and the invention should not be limited thereto. In addition, note that, although the electronic device in FIG. 2A and FIG. 2B is shown as a mobile phone, this is only one of a variety of embodiments, and the invention should not be limited thereto.

Figure 3:
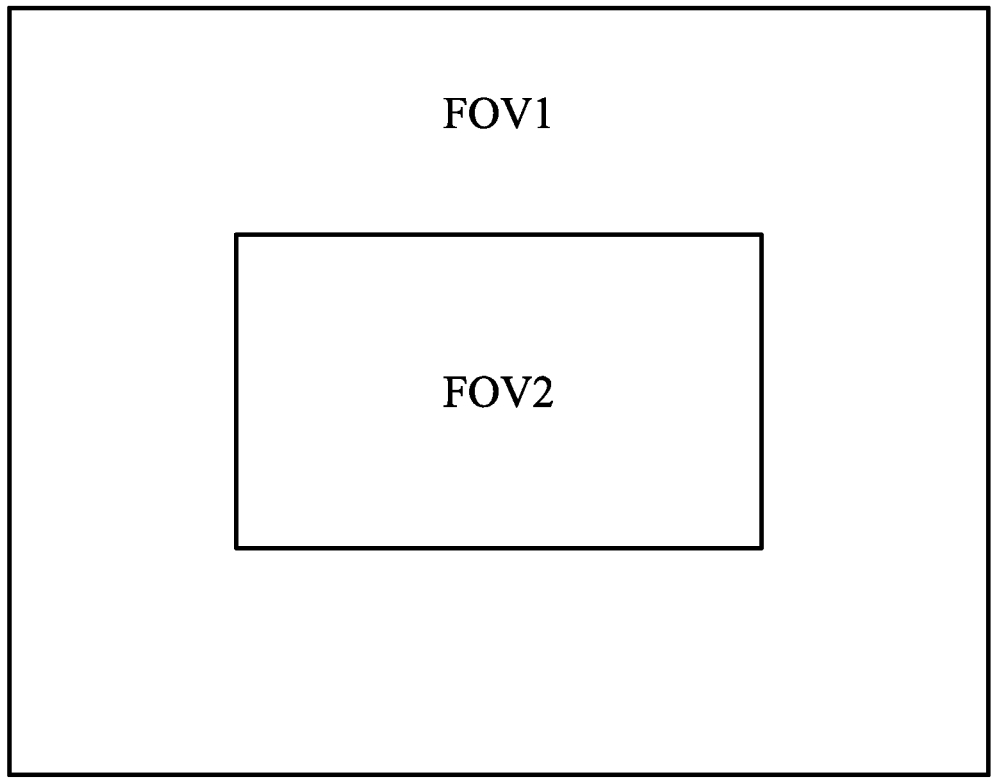
FIG. 3 shows exemplary field of views of the camera modules according to an embodiment of the invention.

As shown in FIG. 2B, two camera modules 210-1 and 210-2 are both placed at the same side of the electronic device. According to an embodiment of the invention, the camera modules 110-1 and 110-2 (or, 210-1 and 210-2) may have the same or different fields of view (FOV). For example, the camera module 110-1 (or 210-1) may have a first field of view FOV1 and the camera module 110-2 (or 210-2) may have a second field of view FOV2, and FOV1 may be larger than FOV2. In addition, according to another embodiment of the invention, one FOV may cover the other. As shown in FIG. 3, FOV1 is larger than and overlaps FOV2.

In addition, according to another embodiment of the invention, the camera modules 110-1 and 110-2 (or, 210-1 and 210-2) may have the same or different frame rates. For example, in one embodiment, the camera modules 110-1 and 110-2 (or, 210-1 and 210-2) may both photograph at the same frame rate, such as 30 fps (frames per second).

Generally, each camera module has a maximum frame rate, which may be a hardware limitation. For example, the camera module 110-1 (or 210-1) may have a maximum frame rate of max_FPS1 and the camera module 110-2 (or 210-2) may have a maximum frame rate of max_FPS2. According to an embodiment of the invention, in order to further increase the frame rate of a plurality of pictures photographed by the proposed electronic device (such as the electronic device 100 or 200), the multimedia processor 130 may instruct the camera modules 110-1 and 110-2 (or, 210-1 and 210-2) to alternately photograph in a time-division manner to obtain a sequence of pictures recorded at a frame rate that is higher than the frame rates adopted by the camera modules 110-1 and 110-2 (or, 210-1 and 210-2). In this manner, the effective frame rate of the sequence of pictures may achieve a value that is higher than the maximum frame rates max_FPS1 and max_FPS2. For example, when maximum frame rates max_FPS1 is equal to max_FPS2, the effective frame rate of the sequence of pictures may be equal to or higher than twice the maximum frame rate max_FPS1 or max_FPS2.

Figure 4:
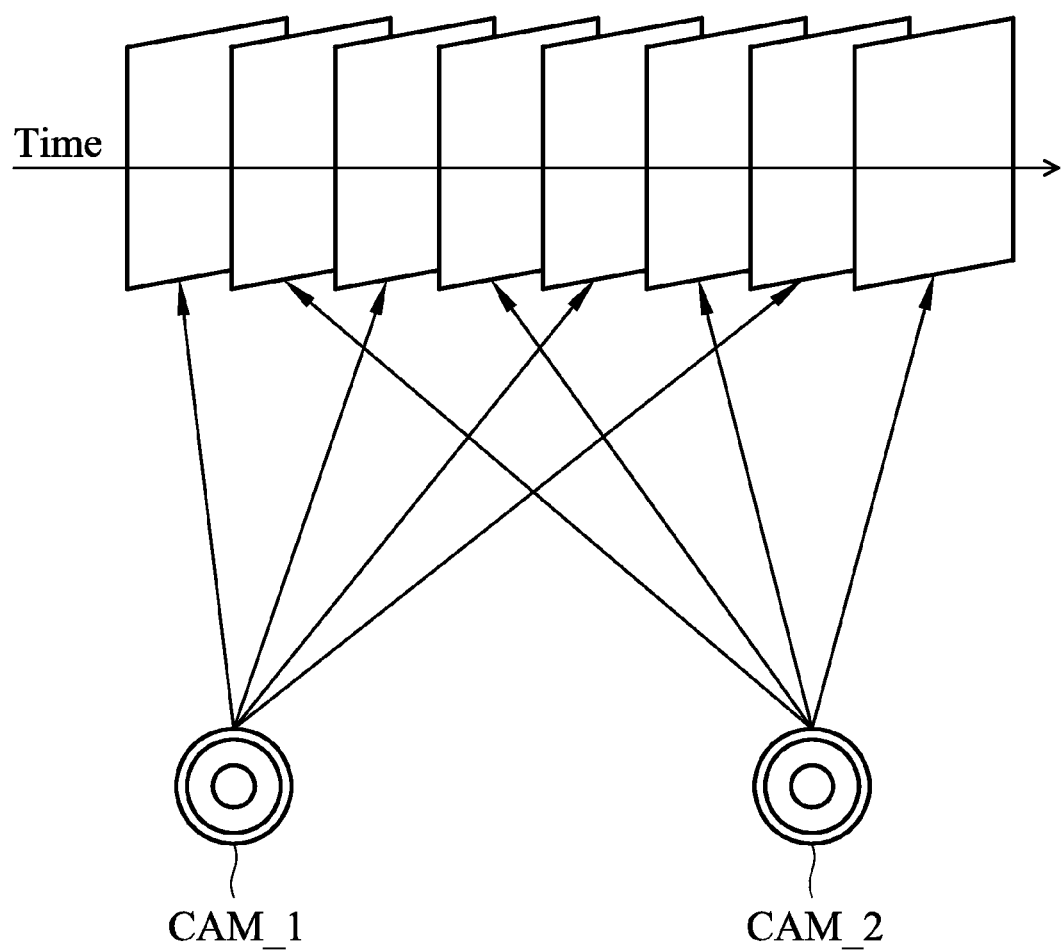
FIG. 4 is a schematic diagram showing the concept of increasing frame rate according to an embodiment of the invention.

FIG. 4 is a schematic diagram showing the concept of increasing frame rate according to an embodiment of the invention. The camera modules CAM_1 and CAM_2 are instructed to alternately photograph to obtain a sequence of pictures over time. When the camera modules CAM_1 and CAM_2 both photograph at the same frame rate, such as 30 fps, the frame rate of the resulting sequence of pictures can be doubled, such as 60 fps, since the time span between two pictures (that is, frames) in the sequence is halved.

According to an embodiment of the invention, the multimedia processor 130 may alternately issue commands via the corresponding interface to instruct the corresponding camera module to photograph at different times. In a preferred embodiment of the invention, the time for each camera module to photograph may be evenly distributed. That is, the time spans between two pictures photographed by different camera modules are preferably fixed.

However, the camera modules usually have different properties and thus have different processing times. Therefore, it is preferable for the multimedia processor 130 to further estimate the processing time of each camera module in advance, and issue commands to the corresponding camera module at more precise times according to the estimated processing times, so as to fix the time span between two pictures photographed by different camera modules.

Figure 5:
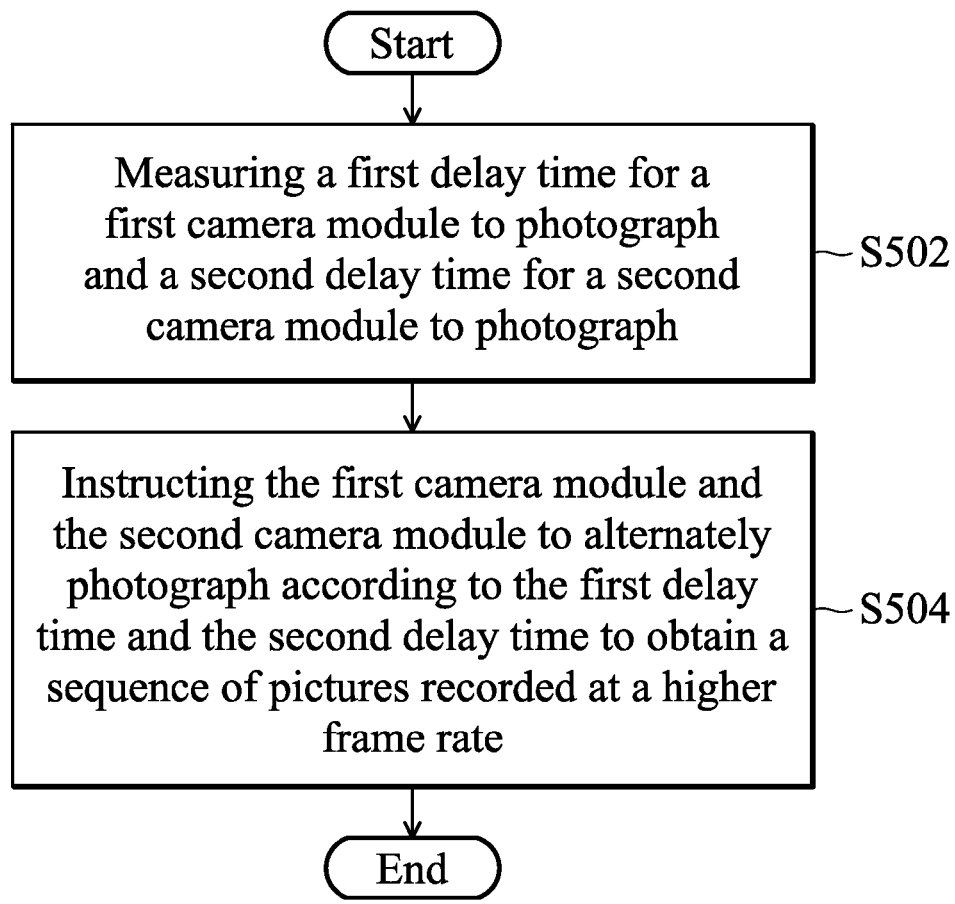
FIG. 5 is a flow chart of a method for increasing the frame rate of a plurality of pictures photographed by an electronic device according to an embodiment of the invention.

FIG. 5 is a flow chart of a method for increasing the frame rate of a plurality of pictures photographed by an electronic device according to an embodiment of the invention. According to an embodiment of the invention, the multimedia processor 130 may first measure a first delay time for a first camera module to photograph and a second delay time for the second camera module to photograph at the initial time of the first camera module and second camera module (Step S502). Next, the multimedia processor 130 may instruct the first camera module and the second camera module to alternately photograph according to the first delay time and the second delay time to obtain a sequence of pictures recorded at a higher frame rate.

According to an embodiment of the invention, the multimedia processor 130 may comprise a timing sync control unit 131 and a delay counter 132 (shown in FIG. 1) to measure delay time of a camera module at the initial time of the corresponding camera module. Note that in the embodiment of the invention, the timing sync control unit 131 and delay counter 132 may be implemented as hardware devices or software modules, and the invention should not be limited thereto. In addition, the timing sync control unit 131 and delay counter 132 may also be implemented as individual hardware devices outside of the multimedia processor 130, and the invention should not be limited thereto.

Figure 6:
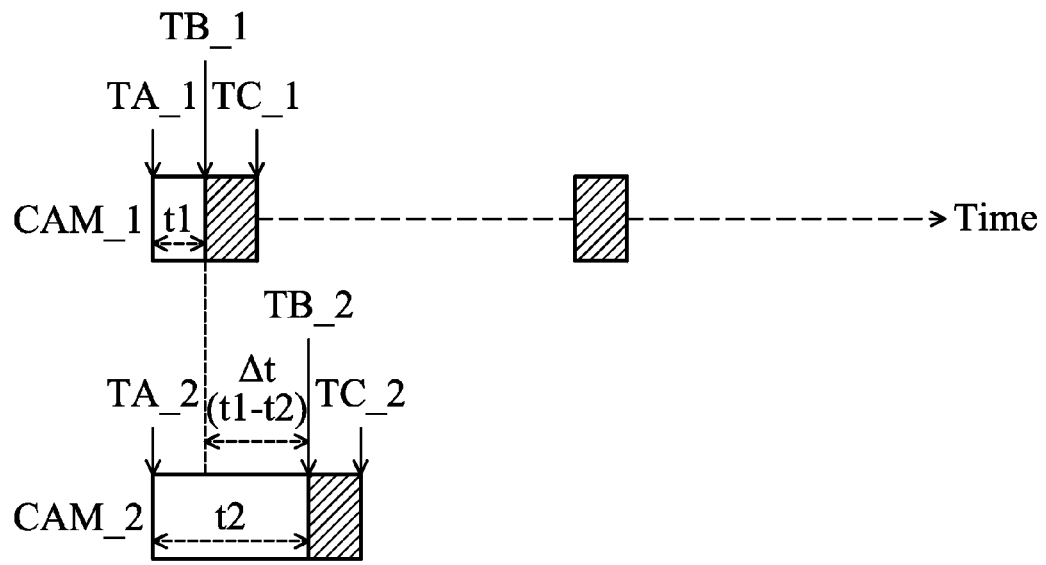
FIG. 6 is a schematic diagram showing the concept of measuring the delay time of the camera modules according to an embodiment of the invention.

FIG. 6 is a schematic diagram showing the concept of measuring the delay time of the camera modules according to an embodiment of the invention. According to an embodiment of the invention, the timing sync control unit 131 (or the multimedia processor 130) may send a command to the camera module at time TA to instruct the corresponding camera module to photograph. For example, as shown in FIG. 6, the timing sync control unit 131 (or the multimedia processor 130) may send a command to the camera module CAM_1 at time TA_1 to instruct the camera module CAM_1 to photograph. Similarly, the timing sync control unit 131 (or the multimedia processor 130) may send a command to the camera module CAM_2 at time TA_2 to instruct the camera module CAM_2 to photograph.

Upon receiving the command, the camera module may initiate or configure the corresponding hardware (such as the camera shutter, image sensor, or others) to prepare for exposing and sensing. According to an embodiment of the invention, each camera module may be designed to send a sensing start signal back to the timing sync control unit 131 (or the multimedia processor 130) at time TB to indicate that the exposing and sensing is beginning. For example, as shown in FIG. 6, the camera module CAM_1 may send a sensing start signal back at time TB_1, and the camera module CAM_2 may send a sensing start signal back at time TB_2. The time span between TA and TB may be regarded as the delay time for the camera module to photograph or the processing time of the camera module. Therefore, as shown in FIG. 6, the delay time/processing time of the camera module CAM_1 is t1=(TB_1−TA_1) and the delay time/processing time of the camera module CAM_2 is t2=(TB_2−TA_2).

The exposure time of each camera module may be configured by the user, and the sensing capability depends on the camera module's hardware capabilities. When the exposure time expires, the camera shutter is closed and the image data sensed by the camera module may be sent to the corresponding frame buffer at time TC (for example, the time TC_1 for camera module CAM_1 and the time TC_2 for camera module CAM_2 as shown) for further processing.

To measure the delay time/processing time, the delay counter 132 (or the multimedia processor 130) may start counting right after the timing sync control unit 131 (or the multimedia processor 130) sends the command to the camera module, and stop counting when receiving the sensing start signal from the camera module. After obtaining the delay time/processing time of the camera module, the multimedia processor 130 may instruct the camera modules to photograph alternately according to the difference between the delay time/processing time of the camera modules. As discussed above, since each camera module may have different properties, the delay time/processing time of the corresponding hardware may be different. As shown in FIG. 6, t2 is longer than t1. Therefore, in the embodiments of the invention, when the multimedia processor 130 instructs the first camera module to photograph at time T0 and the desired time span between two pictures photographed by different camera modules is T, the multimedia processor 130 may instruct the second camera module to photograph at time T0+T−Δt, where Δt=(t2−t1).

Figure 7:
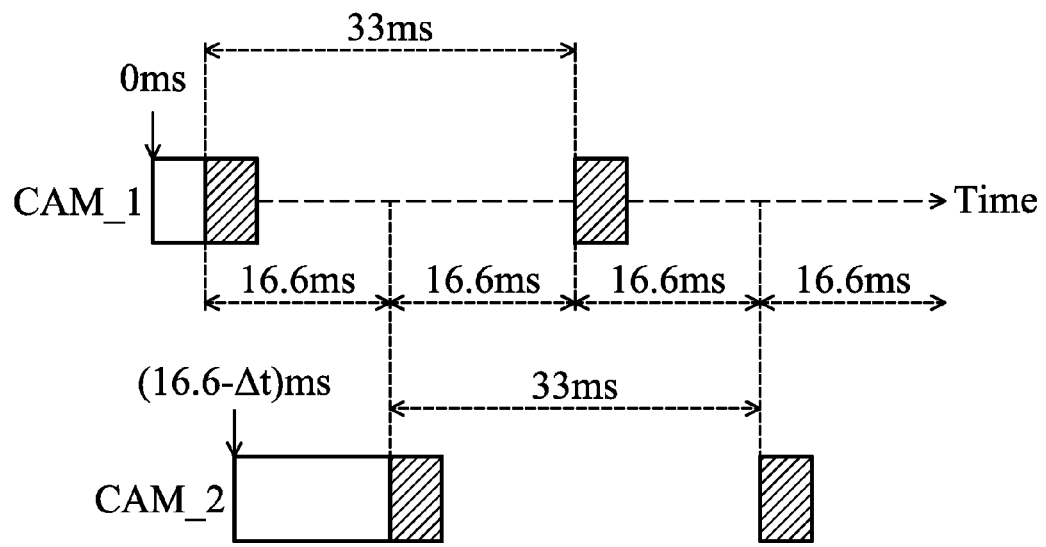
FIG. 7 is a schematic diagram showing the timing to instruct the camera modules to photograph according to an embodiment of the invention.

FIG. 7 is a schematic diagram showing the timing to instruct the camera modules to photograph according to an embodiment of the invention. In this embodiment, suppose that both the camera modules CAM_1 and CAM_2 photograph at a frame rate of 30 fps and the desired frame rate is 60 fps. Therefore, the time span between two pictures photographed by each camera module is about 33 ms, and the desired time span between two pictures photographed by different camera modules is about 16.6 ms. When the difference Δt between the delay time of the camera modules CAM_1 and CAM_2 is obtained, the multimedia processor 130 may first issue a command to instruct the camera module CAM_1 to photograph at 0 ms, and then issue a command to instruct the camera module CAM_2 to photograph at (16.6−Δt) ms. In response to the command, the camera modules CAM_1 and CAM_2 may keep photographing every 33 ms, respectively, thereby a sequence of pictures recorded at 60 fps can be obtained.

Note that although in the embodiments discussed above, the resulting frame rate of the obtained sequence of pictures is twice the frame rate of the corresponding camera module, the invention is not limited thereto. For example, when the electronic device comprises more than two camera modules, such as three camera modules, the resulting frame rate of the obtained sequence of pictures may be triple the frame rate of the corresponding camera module.

In another aspect of the invention, besides the frame rate, the image resolution is also an important factor worthy of concern. In the embodiments of the invention, the pictures photographed by different camera modules may have the same or different resolutions. For example, the pictures photographed by the camera module 110-1 (or 210-1) may have a resolution lower than that of the camera module 110-2 (or 210-2). According to an embodiment of the invention, when the pictures photographed by different camera modules have different resolutions, the multimedia processor 130 may further process the sequence of pictures obtained by different camera modules, so as to enhance the overall image resolution of the sequence of pictures.

Figure 8A:
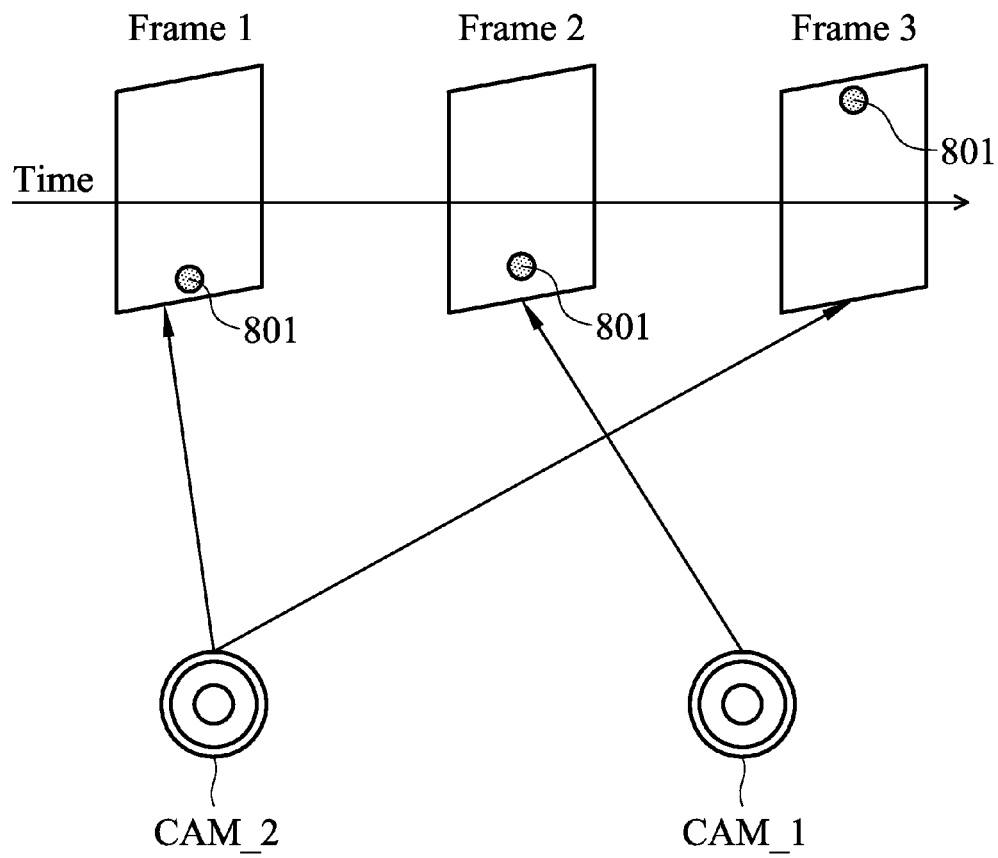
FIG. 8A is a schematic diagram showing the concept of enhancing image resolution of a sequence of pictures alternatively obtained from different camera modules according to an embodiment of the invention.

FIG. 8A is a schematic diagram showing the concept of enhancing image resolution of a sequence of pictures alternatively obtained from different camera modules according to an embodiment of the invention. Suppose that the sequence of pictures comprises at least a picture Frame 2 photographed by the camera module CAM_1 and at least two pictures Frame 1 and Frame 3 photographed by the camera module CAM_2, and the picture Frame 2 has a resolution lower than that of the pictures Frame 1 and Frame 3.

In the embodiments of the invention, in order to enhance image resolution of the sequence of pictures, the multimedia processor 130 may first estimate displacement of an object captured in the sequence of pictures over a plurality of periods of time. As shown in FIG. 8A, the multimedia processor 130 may estimate displacement of the object 801 captured in the sequence of pictures over time.

Figure 8B:
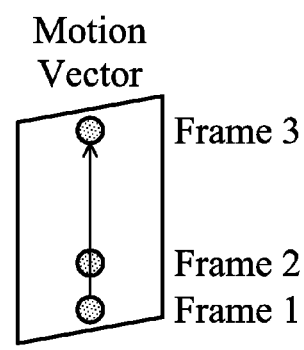
FIG. 8B shows exemplary displacements of the object between different frames according to an embodiment of the invention.

Next, the multimedia processor 130 may select one picture from the pictures Frame 1 and Frame 3 to replace the picture Frame 2 having lower resolution according to the displacement of the object. According to an embodiment of the invention, the multimedia processor 130 may apply the motion estimation method to calculate a motion vector of the object, and select one picture in which a position of the object has a minimum displacement from a position of the object in the picture Frame 2 to be replaced. As shown in FIG. 8B, the displacement of the object between Frame 1 and Frame 2 is smaller than the displacement of the object between Frame 2 and Frame 3. Therefore, in the embodiment, the multimedia processor 130 may select Frame 1 to replace Frame 2 in the sequence of pictures.

According to an embodiment of the invention, the multimedia processor 130 may generate a new frame having the same resolution as the pictures Frame 1 and Frame 3 to replace Frame 2 in the sequence of pictures. The new frame may be generated according to content of Frame 1 and the position of the object in Frame 2. For example, the multimedia processor 130 may piece a plurality of macro blocks together to generate the new frame, wherein the macro blocks may be obtained from Frame 1 and/or Frame 3. As is well known in the art, there are plenty of methods for calculating a motion vector for an object, estimating the displacement of the object, and generating a new frame by piecing plurality of macro blocks together according to the content of the previous/next frame and the position of the object in the current frame to replace a current frame. Therefore, illustrations of detailed implementations are omitted here for brevity.

In yet another aspect of the invention, the frame rate of the camera modules may be adjustable. In this manner, in some embodiments of the invention, the frame rate may be dynamically adjusted according to a moving speed of an object captured in the sequence of pictures, so as to enhance the image quality when capturing an object moving at high speed.

According to an embodiment of the invention, the multimedia processor 130 may estimate displacement of the object over a plurality of periods of time according to the content of the sequence of pictures, and determine whether the moving speed increases or decreases according to the estimated displacement of the object. For example, the multimedia processor 130 may apply a motion estimation method to calculate a motion vector for the object and estimate the displacement of the object over time. When the displacement of the object increases, the multimedia processor 130 may determine that the moving speed of the object is increasing. On the other hand, when the displacement of the object decreases, the multimedia processor 130 may determine that the moving speed of the object is decreasing.

According to an embodiment of the invention, the multimedia processor 130 may increase the frame rate of the camera module when the moving speed increases, and decrease the frame rate of the camera module when the moving speed decreases.

Figure 9:
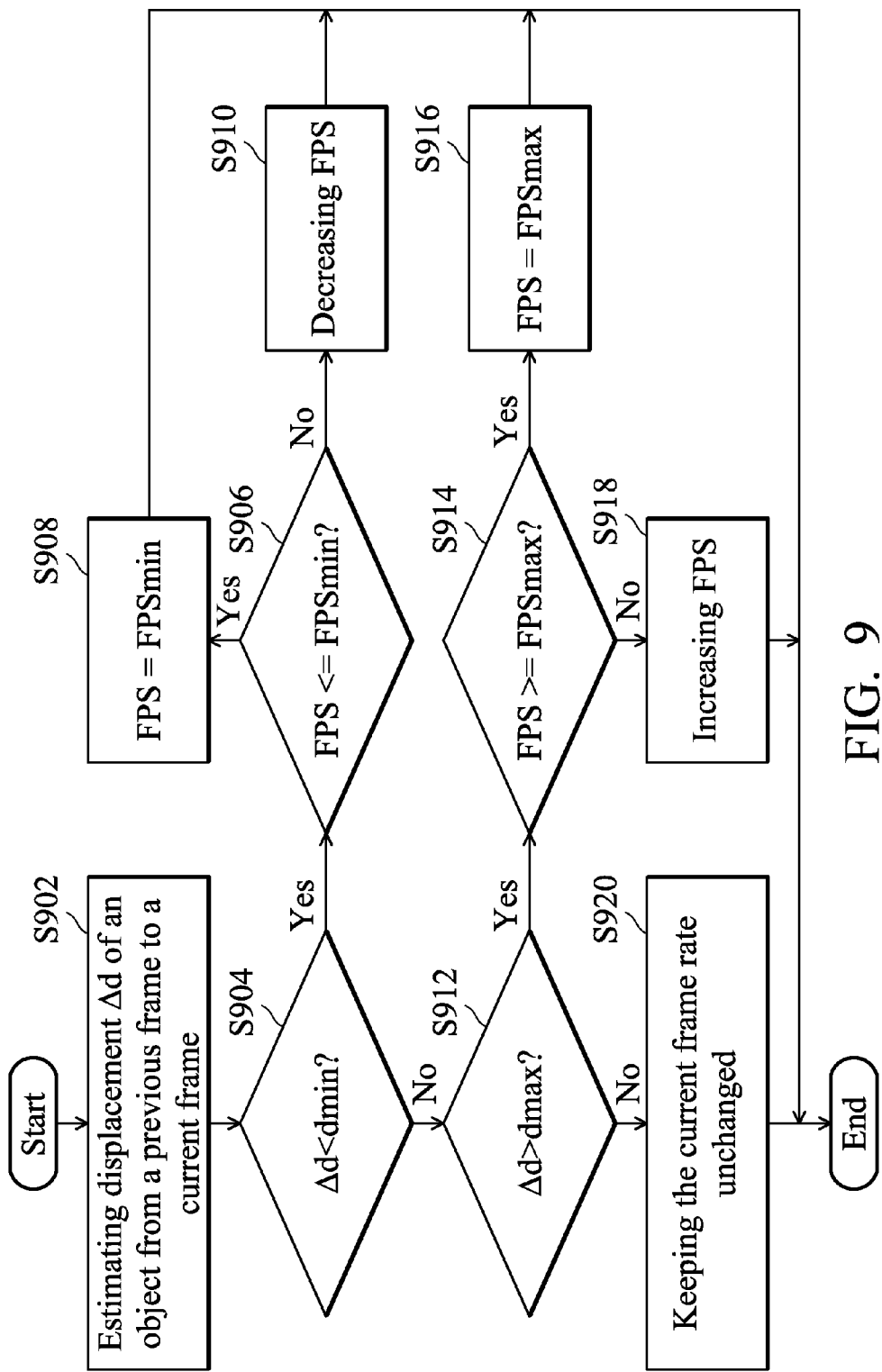
FIG. 9 is a flow chart of a method for dynamically adjusting the frame rate of the camera module according to an embodiment of the invention.

FIG. 9 is a flow chart of a method for dynamically adjusting the frame rate of the camera module according to an embodiment of the invention. Note that the method may be applied to one or more camera modules in the electronic device. First of all, the multimedia processor 130 may estimate displacement Δd of an object from a previous frame Frame 1 to a current frame 2 (Step S902). Next, the multimedia processor 130 may determine whether Δd is smaller than dmin (Step S904), where dmin is a predefined minimum displacement between two frames Frame 1 and Frame 2. If Δd is smaller than dmin, the multimedia processor 130 may further determine whether the current frame rate FPS is smaller than or equal to a predefined minimum frame rate FPSmin (Step S906). If the current frame rate FPS is smaller than or equal to the predefined minimum frame rate FPSmin, the multimedia processor 130 may set the current frame rate FPS to the minimum frame rate FPSmin (Step S908). If not, the multimedia processor 130 may decrease the current frame rate FPS (Step S910).

On the other hand, if Δd is not smaller than dmin, the multimedia processor 130 may further determine whether Δd is greater than dmax (Step S912), where dmax is a predefined maximum displacement between two frames Frame 1 and Frame 2. If Δd is greater than dmax, the multimedia processor 130 may further determine whether the current frame rate FPS is greater than or equal to a predefined maximum frame rate FPSmax (Step S914). If the current frame rate FPS is greater than or equal to a predefined maximum frame rate FPSmax, the multimedia processor 130 may set the current frame rate FPS to the maximum frame rate FPSmax (Step S916). If not, the multimedia processor 130 may increase the current frame rate FPS (Step S918).

If Δd is not smaller than dmin and not greater than dmax, the multimedia processor 130 may do nothing and keep the current frame rate FPS unchanged (Step S920).

According to the embodiments of the invention, by dynamically adjusting the frame rate of the camera module, the object moving at higher speed can be captured at a higher frame rate to enhance the image quality, and the object moving at lower speed can be captured at a lower frame rate to reduce the image data size. The overall photographing/recording performance of the camera module can be greatly improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An electronic device, comprising:
    a first camera module, photographing according to a first frame rate;
    a second camera module, photographing according to a second frame rate; and
    a multimedia processor, coupled to the first camera module and the second camera module, instructing the first camera module and the second camera module to alternately photograph to obtain a sequence of pictures recorded at a third frame rate,
    wherein the third frame rate is higher than the first frame rate and the second frame rate,
    wherein when an image resolution of a picture photographed by the first camera module and an image resolution of a picture photographed by the second camera module are different, at least one picture in the sequence of pictures having a lower image resolution is replaced by another picture in the sequence of pictures having a higher image resolution or replaced by a new frame generated by the multimedia processor and having the higher image resolution,
    wherein the sequence of pictures comprises at least a first picture photographed by the first camera module and having a first resolution and a plurality of second pictures photographed by the second camera module and having a second resolution, and
    wherein the multimedia processor further estimates displacement of an object captured in the sequence of pictures over a plurality of periods of time, selects a second picture from the plurality of second pictures according to the estimated displacement, and generates a third picture having the second resolution to replace the first picture in the sequence of pictures according to content of the selected second picture and a position of the object in the first picture.

2. The electronic device as claimed in claim 1, wherein the first camera module has a first field of view (FOV) and the second camera module has a second FOV, wherein the first FOV is larger than the second FOV.

3. The electronic device as claimed in claim 1, wherein the third frame rate is equal to or higher than twice the first frame rate or the second frame rate.

4. The electronic device as claimed in claim 1, wherein the multimedia processor further measures a first delay time for the first camera module to photograph and a second delay time for the second camera module to photograph, and instructs the first camera module and the second camera module to photograph alternately according to the first delay time and the second delay time.

5. The electronic device as claimed in claim 4, wherein the first delay time relates to a processing time of the first camera module, and the second delay time relates to a processing time of the second camera module.

6. The electronic device as claimed in claim 1, wherein the first frame rate is adjustable, and the multimedia processor further dynamically adjusts the first frame rate according to a moving speed of an object captured in the sequence of pictures, wherein the multimedia processor increases the first frame rate when determining that the moving speed increases.

7. The electronic device as claimed in claim 6, wherein the multimedia processor further estimates displacement of the object over a plurality of periods of time according to content of the sequence of pictures, and determines whether the moving speed increases or decreases according to the estimated displacement of the object.

8. The electronic device as claimed in claim 1, wherein the second resolution is higher than the first resolution.

9. The electronic device as claimed in claim 1, wherein a position of the object in selected second picture has a minimum displacement from the position of the object in the first picture.

10. A method for increasing a frame rate of a plurality of pictures photographed by an electronic device, the electronic device comprising at least a first camera module photographing according to a first frame rate and a second camera module photographing according to a second frame rate, the method comprising:
measuring a first delay time for the first camera module to photograph and a second delay time for the second camera module to photograph;
instructing the first camera module and the second camera module to alternately photograph according to the first delay time and the second delay time to obtain a sequence of pictures recorded at a third frame rate, wherein the sequence of pictures comprises at least a first picture photographed by the first camera module and having a first resolution and a plurality of second pictures photographed by the second camera module and having a second resolution;
estimating displacement of an object captured in the sequence of pictures over a plurality of periods of time according to content of the sequence of pictures;
selecting a second picture from the plurality of second pictures according to the estimated displacement; and
generating a third picture having the second resolution to replace the first picture in the sequence of pictures according to content of the selected second picture and a position of the object in the first picture,
wherein the third frame rate is higher than the first frame rate and the second frame rate, and
wherein when an image resolution of a picture photographed by the first camera module and an image resolution of a picture photographed by the second camera module are different, at least one picture in the sequence of pictures having a lower image resolution is replaced by another picture in the sequence of pictures having a higher image resolution or replaced by a new frame having the higher image resolution.

11. The method as claimed in claim 10, wherein the third frame rate is equal to or higher than twice the first frame rate or the second frame rate.

12. The method as claimed in claim 10, wherein the first camera module and the second camera module are alternately instructed to photograph according to a difference between the first delay time and the second delay time.

13. The method as claimed in claim 10, wherein the first camera module has a first field of view (FOV) and the second camera module has a second FOV, wherein the first FOV is larger than and overlaps the second FOV.

14. The method as claimed in claim 10, wherein the first delay time relates to a processing time of the first camera module, and the second delay time relates to a processing time of the second camera module.

15. The method as claimed in claim 10, wherein the first frame rate is adjustable, the method further comprising:
determining a moving speed of an object captured in the sequence of pictures; and
dynamically adjusting the first frame rate according to the moving speed,
wherein the first frame rate increases when the moving speed increases, and the first frame rate decreases when the moving speed decreases.

16. The method as claimed in claim 15, further comprising:
estimating displacement of the object over a plurality of periods of time according to content of the sequence of pictures; and
determining whether the moving speed increases or decreases according to the estimated displacement of the object.

17. The method as claimed in claim 10, wherein the second resolution is higher than the first resolution.

18. The method as claimed in claim 10, wherein a position of the object in the selected second picture has a minimum displacement from the position of the object in the first picture.

* * * * *